United States Patent
Luo (10) Patent No.: US 12,480,640 B2
(45) Date of Patent: *Nov. 25, 2025

(54) ROD ASSEMBLY FOR AN UMBRELLA

(71) Applicant: Tempo Manufacturing LLC, Jiangsu (CN)

(72) Inventor: Xiong Luo, Nantong (CN)

(73) Assignee: Tempo Manufacturing LLC, Nantong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/897,709

(22) Filed: Sep. 26, 2024

(65) Prior Publication Data
US 2025/0216059 A1    Jul. 3, 2025

(30) Foreign Application Priority Data
Dec. 28, 2023  (CN) .......................... 202311846437.2

(51) Int. Cl.
| | |
|---|---|
| *F21V 19/00* | (2006.01) |
| *A45B 3/04* | (2006.01) |
| *E04H 15/10* | (2006.01) |
| *F21V 33/00* | (2006.01) |
| *F21Y 103/10* | (2016.01) |

(52) U.S. Cl.
CPC .............. *F21V 19/003* (2013.01); *A45B 3/04* (2013.01); *E04H 15/10* (2013.01); *F21V 33/0004* (2013.01); *A45B 2200/1018* (2013.01); *F21Y 2103/10* (2016.08)

(58) Field of Classification Search
CPC ..... F21V 19/003; F21V 33/0004; A45B 3/04; E04H 15/10
See application file for complete search history.

(56) References Cited

U.S. PATENT DOCUMENTS

| | | | | |
|---|---|---|---|---|
| 6,439,249 | B1 * | 8/2002 | Pan ........................ | A45B 3/04 135/910 |
| 6,966,667 | B2 * | 11/2005 | Li ......................... | A45B 23/00 135/910 |
| 8,376,576 | B2 * | 2/2013 | Sloan .................... | F21V 21/005 362/555 |
| 8,702,270 | B2 * | 4/2014 | Wu ........................ | F21K 9/27 362/217.05 |
| 10,532,693 | B2 * | 1/2020 | Hoek ...................... | B60Q 1/32 |
| 10,646,011 | B2 * | 5/2020 | Wei ........................ | A45B 25/18 |
| 10,969,095 | B2 * | 4/2021 | Coelho ................... | F21V 15/01 |
| 2008/0122382 | A1 * | 5/2008 | Moriconi ............. | H05B 47/155 315/291 |
| 2024/0041170 | A1 * | 2/2024 | Ke ......................... | A45B 25/02 |

* cited by examiner

*Primary Examiner* — Matthew J. Peerce
(74) *Attorney, Agent, or Firm* — Wang Law Firm, Inc.

(57) ABSTRACT

A rod assembly for an umbrella comprises a rod; a lampshade assembly comprising a lampshade and a light strip disposed inside the lampshade. The rod has a groove for receiving and positioning the lampshade, the rod has an opening at a bottom of the groove facing downward. A bottom surface of the lampshade is capable of transmitting lights. One or more illuminants are disposed on the light strip facing one of the two sides of the lampshade. The rod assembly of the present invention is reasonable in structure and convenient to disassemble or assemble, thereby bringing great convenience for daily maintenance. Moreover, since the light strip faces one side of the lampshade to emit light, the single bead spots that are originally dense can be diverged to form a uniform light, achieving a better lighting effect.

6 Claims, 7 Drawing Sheets

ROD ASSEMBLY FOR AN UMBRELLA

TECHNICAL FIELD OF THE INVENTION

The present invention relates to a field of an umbrella, and in particular to a rod assembly for an umbrella.

BACKGROUND OF THE INVENTION

As a kind of outdoor leisure items, umbrellas are widely applied in squares, beaches, parks, gardens or similar places to shield an individual from sun. In order to make umbrellas used outdoor have a lighting function, umbrellas equipped with light strips have emerged at present, bringing comfort and convenience to outdoor activities at night in places such as beaches, open-air bars and coffee houses.

However, the light strips are mostly integrated with rods in the current market, are difficult to maintain once damaged, and are too large in packaging volume, resulting in an increase of transportation cost.

Upon searching, a Chinese Patent CN116548713A (patent No.: CN202310494628.0) disclosed a rod assembly for an umbrella comprising a rod and a lampshade assembly, wherein the lampshade assembly comprises a lampshade and a light strip; the rod is a hollow tube with a recess extending lengthwise along the rod on the bottom surface of the rod for receiving and positioning the lampshade; the lampshade is also a hollow tube, and the light strip is disposed inside the lampshade. This lampshade assembly is arranged below the rod, so that the lighting range is wider, and the lighting effect is improved. However, since the light emitted by the light strip is diverged downward, dense single particle spots make lighting uneven, and the product is not beautiful enough.

SUMMARY OF THE INVENTION

It is an object of the present invention to provide a rod assembly for an umbrella, which is simple in design, convenient to assemble or disassemble and maintain, and good in light divergence and lighting effect.

For achieving the above object, the rod assembly for an umbrella comprises a rod having an inner chamber; a lampshade assembly comprising a lampshade and a light strip disposed inside the lampshade; wherein, the rod is a hollow tube and has a groove for receiving and positioning the lampshade, the rod has an opening at a bottom of the groove facing downward extending lengthwise along the rod and allowing light to spread out, a width of the opening is less than a maximum width of the whole groove; the lampshade has a top surface, a bottom surface, and two sides, and the bottom surface of the lampshade is capable of transmitting lights, the lampshade and the light strip extend lengthwise along the rod, one or more illuminants are disposed on the light strip facing one of the two sides of the lampshade.

As an improvement, a longitudinal section of the rod is of a rectangular shape, a partition bar is disposed inside the rod dividing the inner chamber of the rod into an upper part and a lower part both extending lengthwise along the rod, the lower part is defined as the groove; the lampshade is a rectangular hollow tube matching with the groove in size, the two sides and the top surface of the lampshade are unable to transmit the lights, the one or more illuminants which are distributed at regular intervals along a length of the light strip faces at least one of two sides of the lampshade.

Preferably, the lampshade has a strip-shaped hole extending longitudinally for receiving the light strip, a front end of the light strip is connected to a wire and a connector; the lampshade has a front end and a rear end, a front lampshade tube plug is connected to the front end of the lampshade, and a rear lampshade tube plug is connected to the rear end of the lampshade, the front lampshade tube plug has a slot for allowing the wire and the connector to pass through.

Preferably, the rod has a front end and a rear end, a front tube plug is connected to the front end of the rod and a rear tube plug is connected to the rear end of the rod, elastic clamping members protrude from a surface of the front tube plug and a surface of the rear tube plug to be inserted into the upper part of the rod, the front tube plug has a wire groove corresponding to the slot on the front lampshade tube plug.

Preferably, a cross section of the groove of the rod is not limited to being rectangular, and may also of a dovetail shape with an arc-shaped bottom surface, a width of a top of the lampshade is wider than that of a bottom of the lampshade matching with the groove in size.

Preferably, the groove in a dovetail shape is formed by integrally inwardly extruding the bottom surface of the rod which is a hollow metal tube.

Finally, the lampshade matches the light strip in length, the rod matches with the lampshade in length.

Compared with the prior art, the rod assembly for an umbrella of the present invention has the following advantages: the rod has the groove for receiving the lampshade and the groove may be of a rectangular shape or of a dovetail shape with an arc-shaped bottom surface. The width of the opening is less than a maximum width of the whole groove so that the lampshade will not fall off after it is inserted into the groove. The bottom surface of the lampshade is capable of transmitting lights and the two sides and the top surface of the lampshade are unable to transmit the lights. The light strip faces at least one of two sides of the lampshade to emit light. Through the divergence of the lampshade, the spots of particles are diverged to form a whole light band. The rod assembly of the present invention is reasonable in structure and convenient and quick to disassemble or assemble, thereby bringing great convenience for daily maintenance. Moreover, since the light strip faces at least one of two sides of the lampshade to emit light, the single bead spots that are originally dense can be diverged to form a uniform light, so that the lighting effect is better, and the product is more beautiful and flexible to use and can be applied in different scenarios.

DETAILED DESCRIPTION OF THE INVENTION

The present invention will be further described below in detail by embodiments with reference to the accompanying drawings.

Embodiment 1

FIGS. 1-6 show a first preferred embodiment of a rod assembly for an umbrella of the present invention. The rod assembly comprises a rod 1 having an inner chamber, a lampshade assembly B disposed inside the rod 1 which comprises a hollow lampshade 2 having a front end and a rear end, a light strip 3 disposed inside the lampshade 2 and two lampshade tube plugs (a front lampshade tube plug 4 and a rear lampshade tube plug 5) respectively at the front end and the rear end of the lampshade 2.

The rod 1 is a hollow tube with a rectangular longitudinal section. A partition bar 11 is disposed inside the rod 1 dividing the inner chamber of the rod 1 into an upper part and a lower part both extending lengthwise along the rod 1, the lower part is defined as a groove 12 for receiving and positioning the lampshade 2. The rod 1 has an opening 13 at a bottom of the groove 12 facing downward extending lengthwise along the rod 1 and allowing light to spread out. A width of the opening 13 is less than a maximum width of the whole groove 12 so that the lampshade 2 will not fall off from the rod 1 after it is inserted into the groove 12 from one end of the rod 1. The lampshade 2 is a rectangular hollow tube matching with the groove 12 in size. The lampshade 2 and the light strip 3 extend lengthwise along the rod 1. The lampshade 2 has a top surface, a bottom surface 22, and two sides, The two sides and the top surface of the lampshade 2 are unable to transmit the lights. The light strip 3 has a plurality of illuminants 31 which are distributed at regular intervals on the light strip 3 along a length of the light strip 3 faces at least one of two sides of the lampshade 2 (a left side and/or a right side of the lampshade 2). The bottom surface 22 of the lampshade 2 is a surface capable of transmitting lights, while the two sides and the top surface of the lampshade 2 are unable to transmit the lights, so that through the divergence of the lampshade 2, the single bead spots of the illuminants 31 that are originally dense are diverged to form a uniform long light, and the lighting effect of the rod assembly is better.

The lampshade 2 has a strip-shaped hole 21 extending longitudinally for receiving the light strip 3, a front end of the light strip 3 is connected to a wire 32 and a connector 33. The front lampshade tube plug 4 is connected to the front end of the lampshade 2, and the rear lampshade tube plug 5 is connected to the rear end of the lampshade 2, the front lampshade tube plug 4 has a slot 41 for allowing the wire 32 and the connector 33 to pass through. The rod 1 has a front end and a rear end, a front tube plug 6 is connected to the front end of the rod 1 and a rear tube plug 7 is connected to the rear end of the rod 1. Elastic clamping members 62/72 protrude from a surface of the front tube plug 6 and a surface of the rear tube plug 7 to be inserted into the upper part of the rod 1. The front tube plug 6 has a wire groove 61 corresponding to the slot 41 on the front lampshade tube plug 4.

In this embodiment, the lampshade 2 matches the light strip 3 in length, the rod 1 matches with the lampshade 2 in length. The mounting and electrical connection of the light strip 3 is the same as those in the prior art and will not be repeated here.

During assembling, the light strip 3 is inserted into the lampshade 2 from the strip-shaped hole 21 of the lampshade 2, the wire 32 extends out of the front end of the lampshade 2, and the front lampshade tube plug 4 is connected to the front end of the lampshade 2 and the rear lampshade tube plug 5 is connected to the rear end of the lampshade 2. The assembled lampshade assembly B is inserted into the groove 12 of the rod 1. Finally, the front tube plug 6 is connected to the front end of the rod 1 and the rear tube plug 7 is connected to the rear end of the rod 1. Since the width of the opening 13 of the rod 1 is smaller than that of the groove 12, the lampshade assembly B can be firmly positioned in the groove 12 and will not fall off from the rod 1.

When the light strip 3 needs to be repaired or replaced, the light strip 3 can be taken out by detaching the lampshade assembly B from the rod 1, so that it is convenient and quick to assemble or disassemble.

Figure 1:
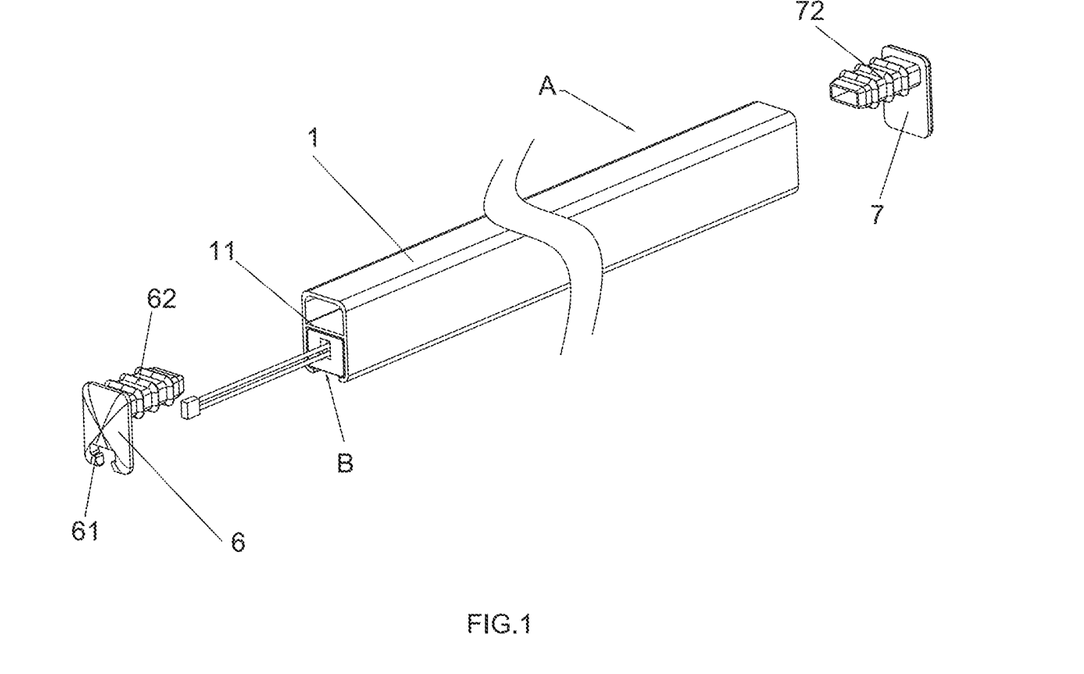
FIG. 1 is a perspective view of a rod assembly for an umbrella according to Embodiment 1 of the present invention.
Figure 2:
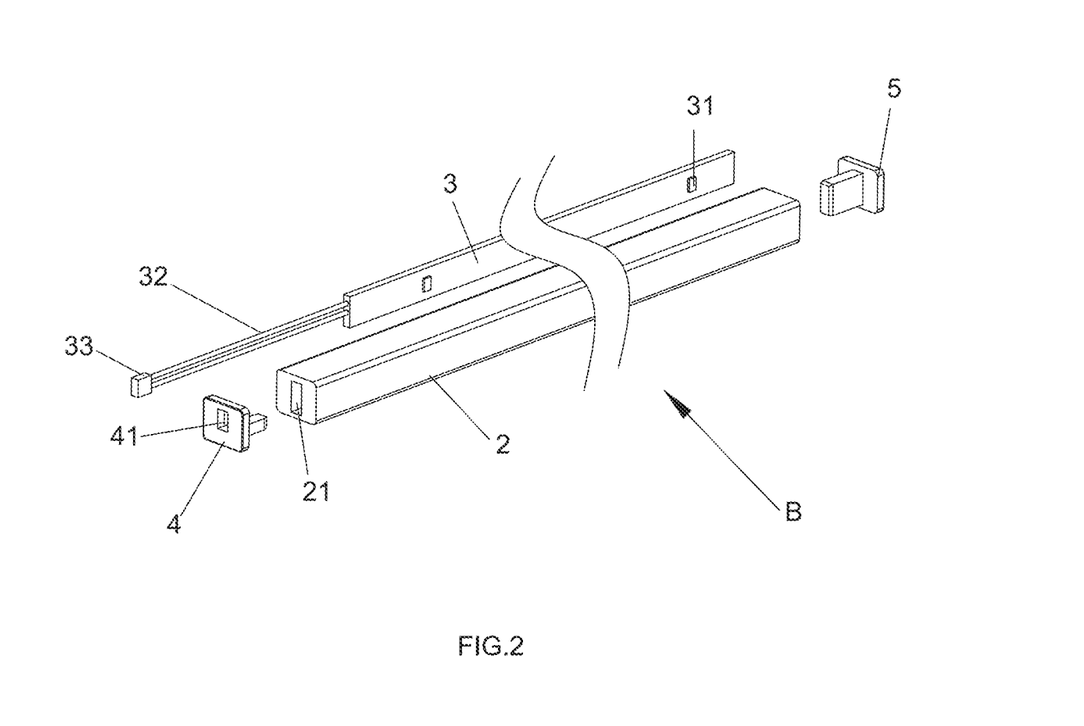
FIG. 2 is an exploded view of a lampshade assembly according to Embodiment 1 of the present invention.
Figure 3:
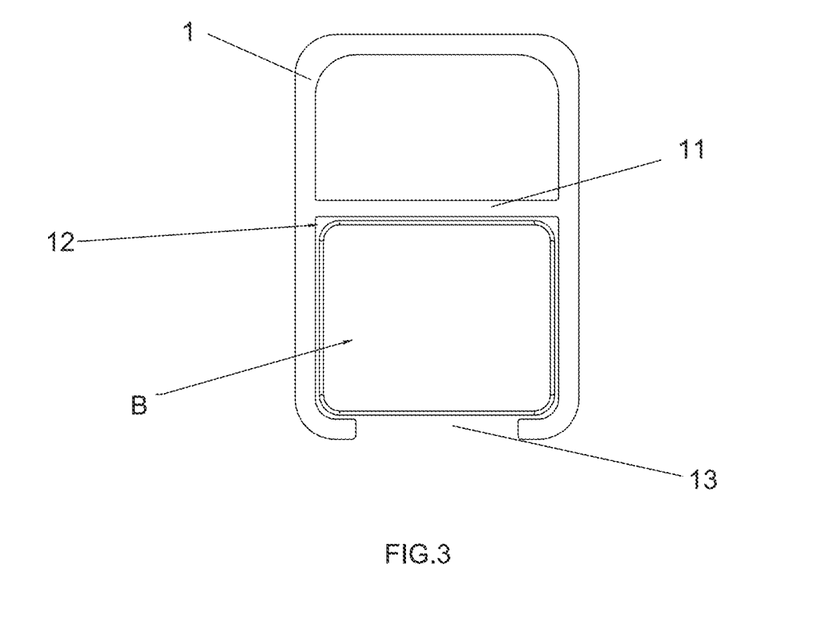
FIG. 3 is a front view of the lampshade assembly in the rod according to Embodiment 1 of the present invention.
Figure 4:
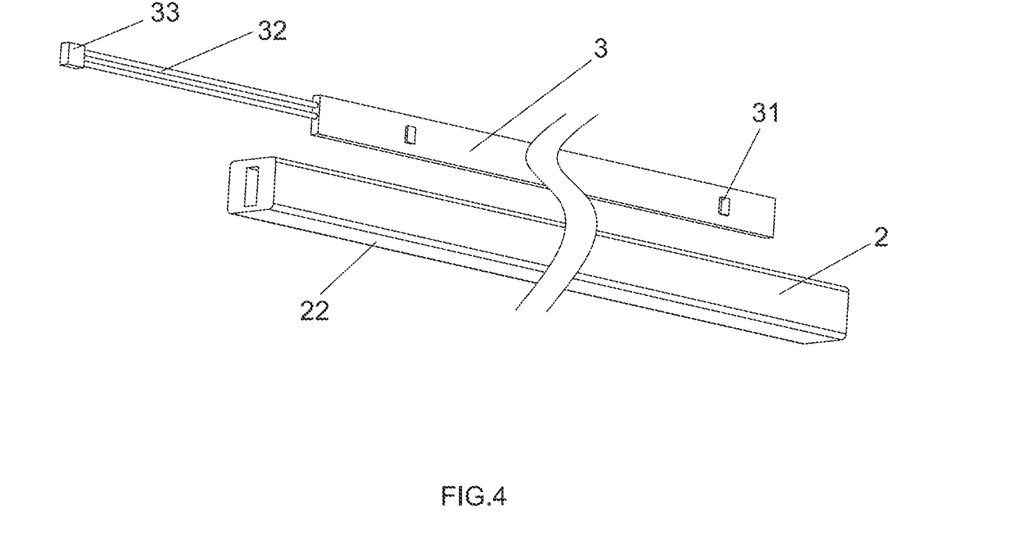
FIG. 4 is another exploded view of the lampshade assembly when two lampshade tube plugs are omitted.
Figure 5:
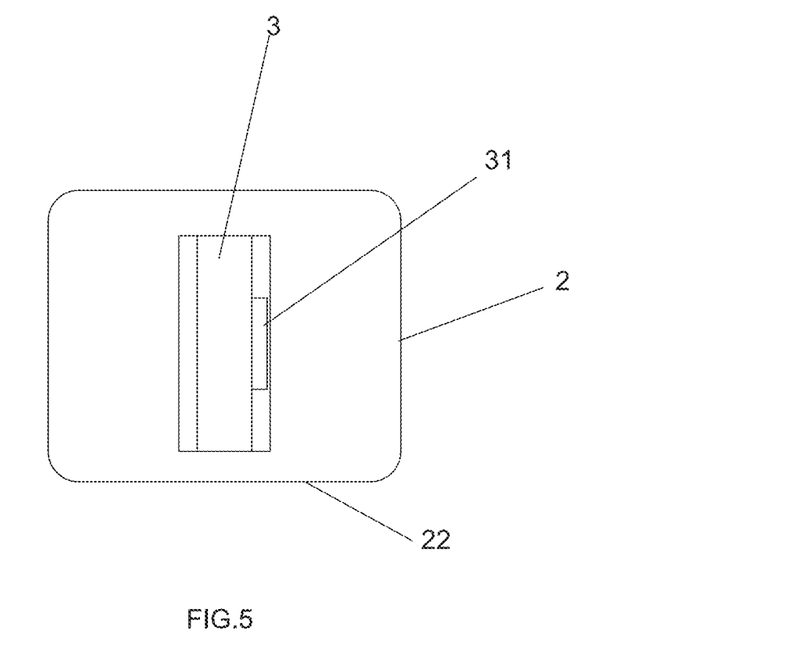
FIG. 5 is a front view of the light strip in the lampshade.
Figure 6:
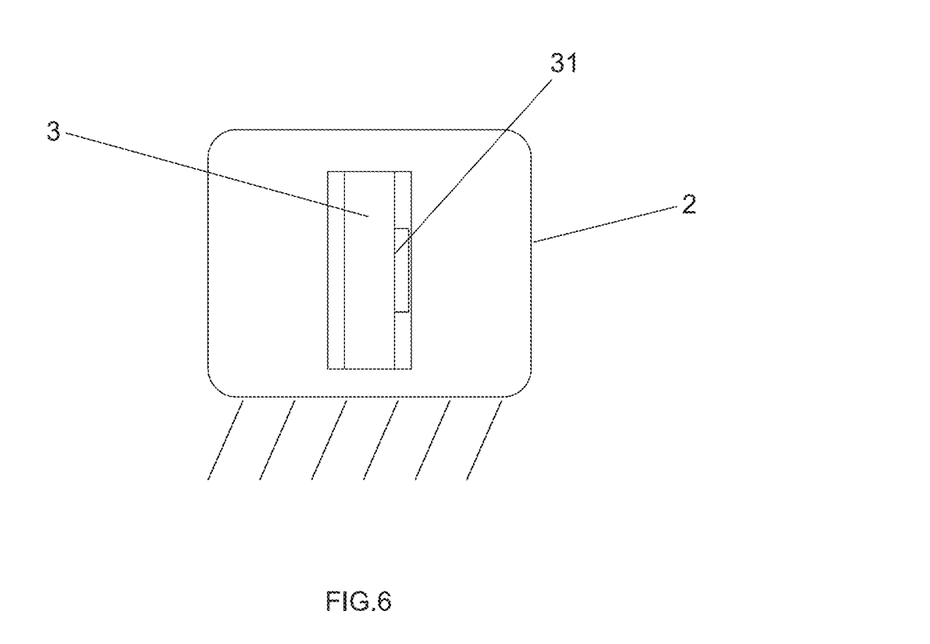
FIG. 6 is a diagrammatic sketch showing the lampshade assembly lightning out.

When in use, the light strip 3 faces at least one of two sides of the lampshade 2 so that the light emitted by the light strip 3 is diverged by the lampshade 2 and then spread out from the bottom surface 22 of the lampshade 2 for uniform illumination. The lightning rod assembly is more beautiful.

Embodiment 2

Figure 7:
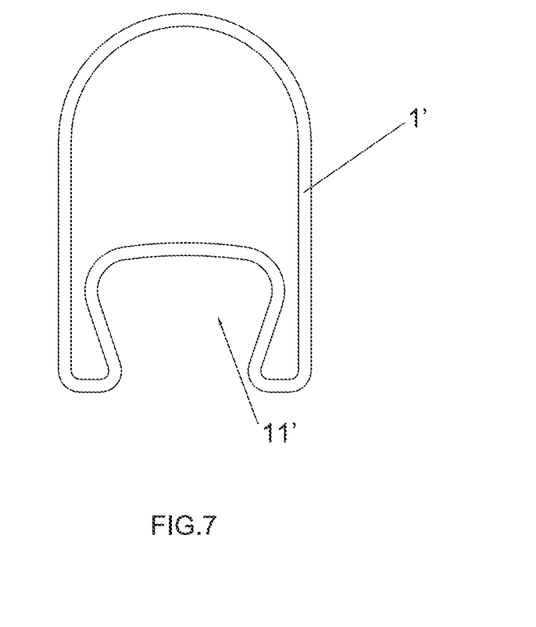
FIG. 7 is a sectional view of a rod according to Embodiment 2 of the present invention.
Figure 8:
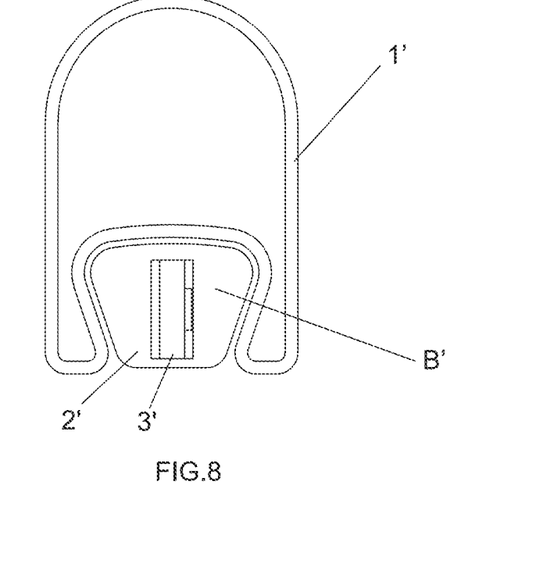
FIG. 8 is a sectional view of the lampshade assembly in the rod according to Embodiment 2 of the present invention.

FIGS. 7 and 8 show a second embodiment of a rod assembly for an umbrella of the present invention. The rod assembly comprises a rod 1' having an inner chamber; a lampshade assembly B' comprising a lampshade 2' and a light strip 3' disposed inside the lampshade 2. The rod assembly in this embodiment differs from that in Embodiment 1 in that: a cross section of a groove 11' of the rod 1' is of a dovetail shape with an arc-shaped top surface, a width of a top of the lampshade 2' is wider than that of a bottom of the lampshade 2' matching with the groove 11' in size. The groove 11' in a dovetail shape is formed by integrally inwardly extruding the bottom surface of the rod 1' which is a hollow metal tube.

During assembling, the assembled lampshade assembly B' is inserted into the groove 11' of the rod 1'. Finally, lampshade tube plugs are respectively connected to the front and rear end of the rod 1'. Since the groove 11' is of a dovetail shape with an arc-shaped bottom surface, the lampshade assembly B' can be firmly positioned in the groove 11' and will not fall off from the groove 11'.

The rod 1 in the above embodiments may be a long rod or a short rod in an umbrella.

Figure 9:
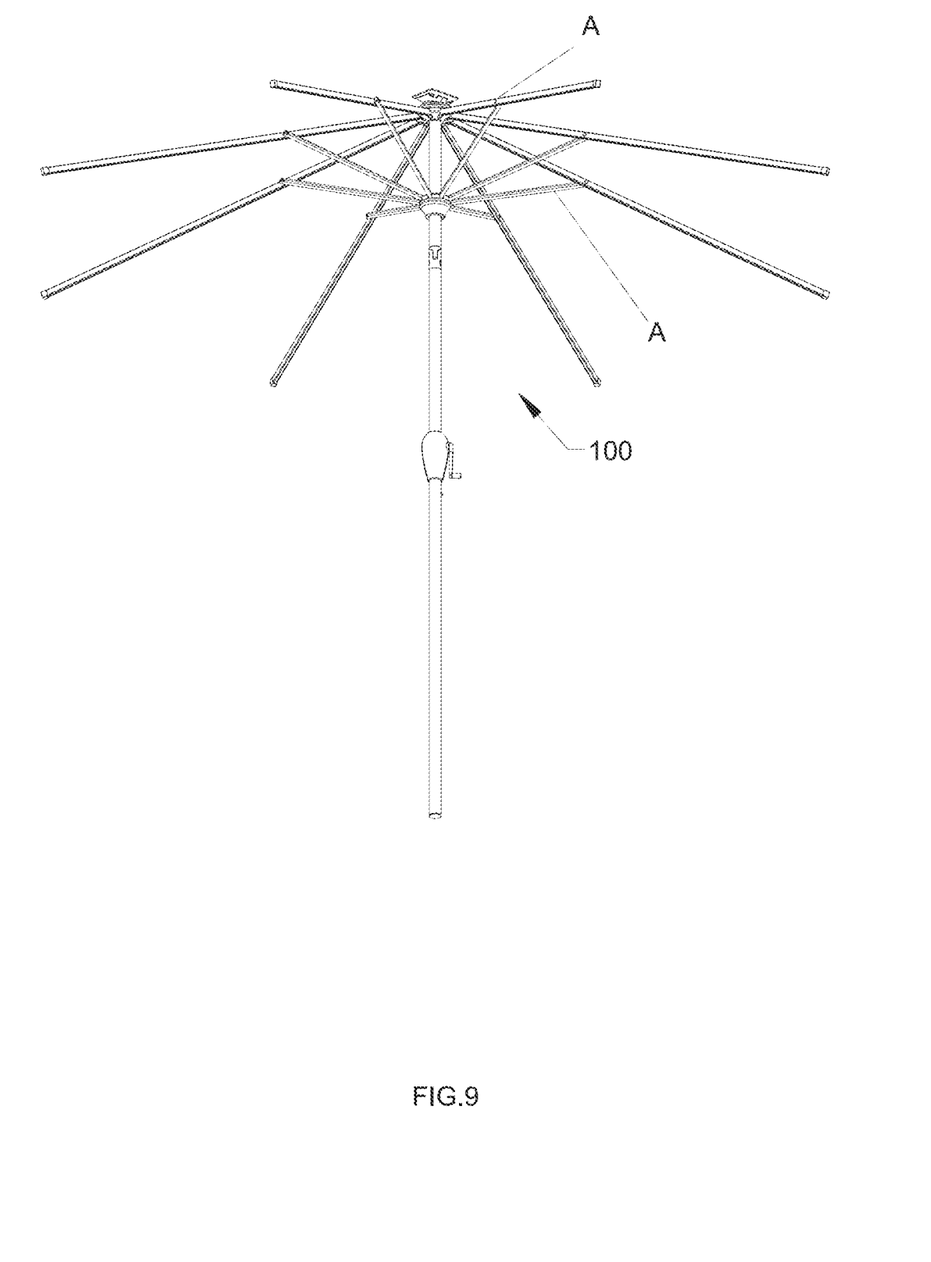
FIG. 9 is a perspective view of a center pole umbrella mounted with the rod assembly of the present invention.
Figure 10:
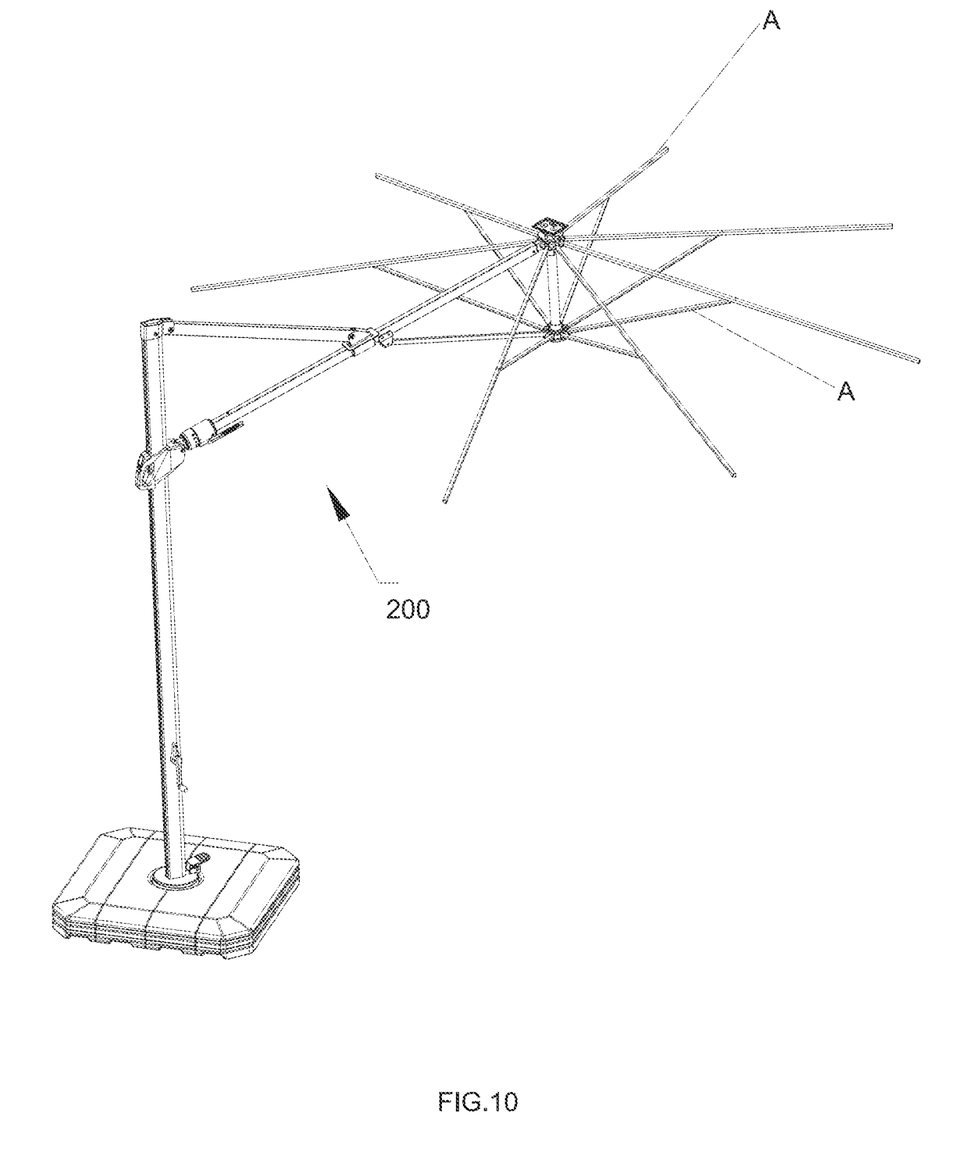
FIG. 10 is a perspective view of a cantilever umbrella mounted with the rod assembly of the present invention.
Figure 11:
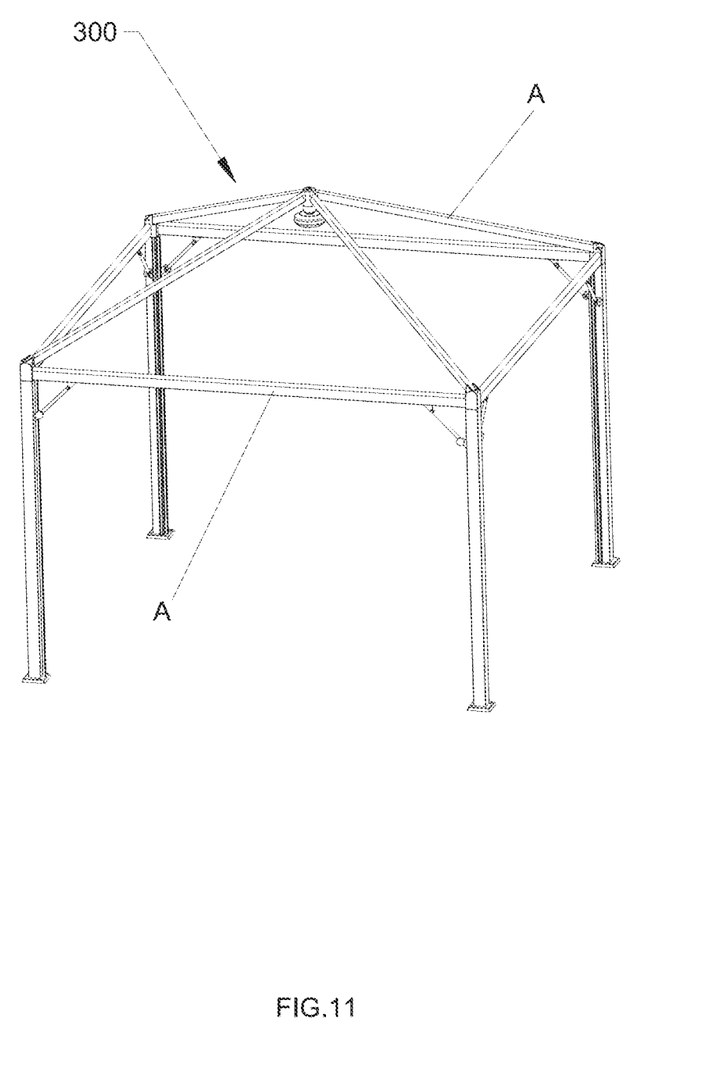
FIG. 11 is a perspective view of a light shed mounted with the rod assembly of the present invention.

The rod assembly for an umbrella A of the present invention may be mounted on a center pole umbrella 100 or a cantilever umbrella 200, as shown on FIGS. 9 and 10, or may be mounted on a light shed 300, as shown in FIG. 11.

The protection scope of the present invention is not limited to each embodiment described in this description. Any changes and replacements made on the basis of the scope of the present invention patent and of the description shall be included in the scope of the present invention patent.

The invention claimed is:

1. A rod assembly for an umbrella, comprising:
a rod having an inner chamber;

a lampshade assembly comprising a lampshade and a light strip disposed inside the lampshade;

wherein, the rod is a hollow tube and has a groove for receiving and positioning the lampshade, the rod has an opening at a bottom of the groove facing downward extending lengthwise along the rod and allowing light to spread out, a width of the opening is less than a maximum width of the whole groove;

the lampshade has a top surface, a bottom surface, and two sides, and the bottom surface of the lampshade is capable of transmitting lights, the two sides of the lampshade are unable to transmit light, the lampshade and the light strip extend lengthwise along the rod, one or more illuminants are disposed on the light strip facing one of the two sides of the lampshade perpendicular to a direction of light emission;

a cross-section of the groove of the rod comprises a dovetail shape with an arc-shaped top surface, a width of a top of the lampshade is wider than a width of a bottom of the lampshade matching the groove in size.

2. The rod assembly of claim 1, wherein a longitudinal section of the rod is of a rectangular shape, a partition bar is disposed inside the rod dividing the inner chamber of the rod into an upper part and a lower part both extending lengthwise along the rod, the lower part is defined as the groove;

the lampshade is a hollow tube matching with the groove in size, the two sides and the top surface of the lampshade are unable to transmit the lights, the one or more illuminants are distributed at regular intervals along a length of the light strip.

3. The rod assembly of claim 1, wherein the lampshade has a strip-shaped hole extending longitudinally for receiving the light strip, a front end of the light strip is connected to a wire and a connector;

the lampshade has a front end and a rear end, a front lampshade tube plug is connected to the front end of the lampshade, and a rear lampshade tube plug is connected to the rear end of the lampshade, the front lampshade tube plug has a slot for allowing the wire and the connector to pass through.

4. The rod assembly of claim 2, wherein the rod has a front end and a rear end, a front tube plug is connected to the front end of the rod and a rear tube plug is connected to the rear end of the rod, elastic clamping members protrude from a surface of the front tube plug and a surface of the rear tube plug to be inserted into the upper part of the rod, the front tube plug has a wire groove corresponding to the slot on the front lampshade tube plug.

5. The rod assembly of claim 1, wherein the groove in a dovetail shape is formed by integrally inwardly extruding the bottom surface of the rod which is a hollow metal tube.

6. The rod assembly of claim 1, wherein the lampshade matches the light strip in length, the rod matches with the lampshade in length.

* * * * *